Nov. 12, 1929.  C. S. MINER ET AL  1,735,084
PROCESS OF MANUFACTURING FURFURAL
Filed Sept. 7, 1922
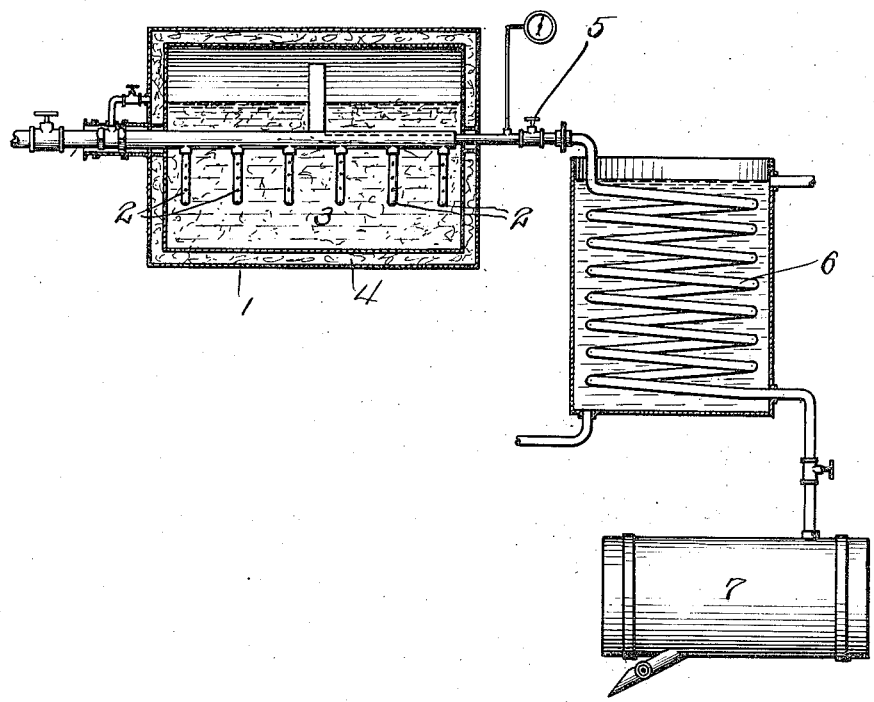

Patented Nov. 12, 1929

1,735,084

UNITED STATES PATENT OFFICE

CARL S. MINER, OF CHICAGO, ILLINOIS, AND HAROLD J. BROWNLEE, OF CEDAR RAPIDS, IOWA, ASSIGNORS TO QUAKER OATS COMPANY, OF CHICAGO, ILLINOIS, A CORPORATION OF NEW JERSEY

PROCESS OF MANUFACTURING FURFURAL

Application filed September 7, 1922. Serial No. 586,795.

Our invention relates to improvements in processes for manufacturing furfural and volatile organic materials and it has special reference to such a process as may be practiced on a commercial scale to produce economically the aforesaid materials.

More particularly our present invention pertains to a process for manufacturing furfural and the like from roughages such as oat hulls, rice hulls, cotton seed hulls, corn cobs, etc. whereby furfural may be produced and recovered in quantities commensurate with commercial requirements and economical production.

Heretofore furfural has been generally produced by processes that resulted in the recovery of only a comparatively small amount of furfural. Such processes have involved immersing certain roughage materials in a strongly acid liquid and then heating this resultant liquid mixture, which comprises a substantially large water content, either with or without subjecting it to pressure, thereby ensuring a chemical reaction which results in the procurement of furfural. But furfural produced as described above is mixed with such extremely large quantities of water as to render the separation of the furfural from the reaction mixture an extremely tedious and expensive process.

Unless the furfural is removed from this reaction mixture substantially as fast as it is formed the furfural, under the conditions present, will be rapidly destroyed or decomposed and, as a result, the furfural production is considerably decreased.

By means of our present invention, we are able to increase appreciably the yield of furfural from roughage material and, at the same time, reduce considerably the cost of manufacture. We have found that if roughage material, such as oat hulls, is merely dampened with an acid liquid and subsequently exposed to heat and pressure, a substantially high yield of furfural results which is capable of being separated in more concentrated form than in previously known processes, whereby the cost of producing this product is greatly minimized. Again, in accordance with our present process, we are able to produce furfural at the expense of minimum decomposition or destruction of the furfural actually formed during the treatment of the roughage material. By thoroughly impregnating the reaction mixture with a continuous flow of a gas that serves as a carrier for the furfural, the furfural may be withdrawn from the reaction mixture substantially as quickly as formed. We accomplish this by injecting a multiplicity of steam jets through the body of the reaction mixture thereby thoroughly exposing the body of the mixture to the action of the steam in a fine state of subdivision and then withdrawing therefrom the steam which serves as a carrier for the furfural into a condenser. As a consequence, the furfural is volatilized and removed from the reaction chamber substantially as quickly as it is formed. By reason of this removal of the furfural very little furfural is decomposed or destroyed in the reaction chamber and this results in a very high yield of furfural.

Other advantages resulting from the practice of our improved process will be apparent from the following description to which reference may now be had for a more complete understanding of the nature and scope of our invention.

Since we employ roughage material that preferably has been merely dampened with and acid liquid, less steam is required than in other processes heretofore practiced for a similar purpose. Again, in our present process less acid is required and a saving in acid and in neutralizing material therefore results. We have ascertained that, in accordance with our invention, the increased yield of furfural accruing by reason of the use of a lesser amount of acid liquid is considerably greater than could be anticipated, since such increase in the yield of furfural is not in proportion to the acid concentration but greatly in excess thereof. In other words, the enhanced yield of furfural resulting from a decrease in the liquid content comprised in the mixture with the roughage material is not in direct proportion to the acid concentration of the solution present but greatly in excess thereof.

We have also discovered that if, during the exposure of the above dampened reaction mixture (i. e., one that contains no free liquid) to heat and pressure, the mixture is simultaneously agitated and exposed to a multiplicity of currents of steam passing through the digester, such currents of steam will remove at a sufficiently high rate the furfural being formed so as to minimize the destruction or decomposition of furfural which occurs when furfural is exposed for any substantial period to the reaction conditions necessary for its formation. Furfural may then be procured by our process in large quantities, separated in higher concentrations and produced with lower consumption of steam than by the methods heretofore known and practiced.

For a better understanding of our invention reference may be had to the following description and the accompanying drawing in which we have illustrated one form of apparatus for practicing our present invention.

In practicing our process, we have found the following mixture and mode of procedure satisfactory, but it is to be understood that we are not to be limited to the specific character or proportioning of ingredients or to the definite limits of time and pressure which we mention herein as being very suitable. In practicing our method, we employ preferably an apparatus of the general character diagrammatically illustrated in the single figure of the accompanying drawing wherein is illustrated a rotary steam jacket digester or autoclave 1 of any well known type that is preferably provided with a plurality of pipes or steam inlets 2 in order to pass a very large number of fine jets of steam through the reaction material 3 undergoing treatment. Into such a digester we put substantially 3000 pounds of oat hulls uniformly impregnated with a mixture of about 750 pounds of water and about 56¼ pounds of sulphuric acid (95% strength). The digester is then closed and rotated and if it is not sufficiently heated from a prior treatment, steam is admitted into the jacket 4 of the autoclave for such length of time as is necessary to raise the temperature of the autoclave to approximately that of steam at 60 pounds pressure. After the temperature of the mixture within the autoclave has been substantially raised, steam (in the form of a multiplicity of jets) is admitted to the cooker through the aforesaid pipes or inlets 2 and, as a consequence, the reaction mixture 3 comprising the oat hulls becomes thoroughly admixed therewith. The steam pressure within the digester is raised to about 60 pounds per square inch. When the steam pressure within the autoclave approximates this value, the valve 5 of the exhaust line leading to the condenser 6 is opened sufficiently to allow steam to flow into the condenser at the rate of 1000 to 1200 pounds per hour. The autoclave is continually revolved and the steam supply is regulated so as to maintain in the digester a pressure of substantially 60 pounds. Steam is thus permitted to thoroughly intermix with the oat hulls for four or five hours. After this period of time, all of the steam contained within the autoclave is blown off into the condenser and additional steam at atmospheric pressure may then be passed through the oat hulls to remove the residual furfural. However, this last step is frequently not necessary.

The steam condensed in the condenser 6 contains about 5 to 6 percent of furfural and usually amounts to 5000 or 6000 pounds. The condensed liquid within the container 7 is neutralized in any suitable way, preferably by adding hydrated lime or any other alkaline or neutralizing material, to ensure complete neutralization of the acid, and then is distilled to recover the furfural which will amount to substantially more than 10% by weight of the total amount of oat hulls initially placed within the digester.

Our present process contemplates the continuous removal of the furfural from the reaction mixture, whether acid is added or not, since we eliminate the possibility of any substantial amount of furfural being decomposed or destroyed by immediately removing it after formation from the digester or autoclave to the condenser. Therefore, it is obvious that our improved method will be highly advantageous when used both in the absence of and in the presence of an added acid content in the reaction mixture.

From the foregoing, it will be apparent that the mixture initially placed within the digester preferably comprises roughage material that has been merely dampened with an acid liquid mixture. Of course, while we have specified oat hulls as our preferred roughage material, it is to be understood that our method is applicable with advantageous results to the use of other furfural yielding material, such as cotton seed hulls, rice hulls and the like. Again, it is obvious that acids other than sulphuric acid may be used and that the proportions which we have indicated above may likewise be varied.

Oat hulls, as roughage material from which furfural may be procured in accordance with the process of this present invention, are highly desirable because they are resilient and do not pack within the autoclave or digester when they are dampened and when the digester is rotated during the processing of them. The mass of oat hulls is extremely porous and, consequently, permits thorough admixture therewith of the liquid which dampens the mass. Again, by reason of the porosity of the mass of oat hulls, the carrier steam or gas is permitted to penetrate the mass thoroughly, thereby bringing the carrier for the furfural, as it is produced, into intimate contact with all parts of the mass of oat hulls.

While the term reaction mixture as used herein applies generally to the merely dampened mixture of liquid, catalyst and roughage material in which the furfural is formed, this term "reaction mixture" in its most specific sense applies to the mixture of liquid, catalyst (when and if used) and dissolved pentose, the constituents that are immediately involved in that reaction which results in the formation of furfural. In our process this reaction mixture may be considered as being contained within a large number of relatively small particles of roughage material and these particles of material are continually surrounded by steam which is the active agent in removing the furfural from the liquid in the dampened reaction mixture substantially as quickly as it is formed therein.

While we have herein described our method of practicing our invention, it is to be understood that our invention is not to be limited except in accordance with the appended claims.

Having thus described our invention, what we claim as new and desire to secure by Letters Patent is:—

1. The process of manufacturing furfural which comprises impregnating a mass of roughage material with a quantity of acid liquid sufficient merely to dampen said roughage material, and subjecting this reaction mixture to the conjoint action of heat, pressure and a continuous supply of steam for removing the furfural from the liquid in the dampened reaction mixture substantially as quickly as formed.

2. The process of manufacturing furfural which consists in impregnating uniformly a mass of roughage material with a quantity of dilute sulfuric acid sufficient merely to dampen said roughage material, and subjecting this roughage material to the conjoint action of heat, pressure and a continuous supply of steam for removing the furfural from the reaction mixture as formed while maintaining said mass of roughage material in a dampened state.

3. The process of manufacturing furfural which consists in uniformly impregnating a mass of oat hulls with a quantity of dilute sulphuric acid sufficient merely to dampen said mass of oat hulls, and subjecting this reaction mixture to the conjoint action of heat, pressure and a continuous supply of steam for removing the furfural from the reaction mixture as formed.

4. The process of manufacturing furfural which comprises mixing a mass of roughage material with a furfural forming catalyst and a quantity of a liquid sufficient only to dampen said mass, and subjecting the same to the action of heat, pressure and a continuous supply of steam for maintaining the reaction temperature and removing the furfural from the liquid in the dampened reaction mixture substantially as quickly as formed.

5. The process of manufacturing furfural which comprises mixing a mass of oat hulls with a liquid comprising sulphuric acid in order to merely dampen said mass, and subjecting this dampened mass to the action of heat, pressure and a continuous supply of steam for removing from the reaction mixture the furfural as formed.

6. The method of manufacturing furfural which comprises submitting a dampened furfural yielding mass of material and a furfural forming catalyst to the simultaneous action of pressure and a continuously supplied current of gas while maintaining said mass in dampened condition, said gas serving to maintain the reaction temperature and as a carrier for removing the furfural from the liquid in the reaction mixture.

7. The process of manufacturing furfural which comprises dampening a mass of roughage material with an acid liquid, and subjecting this reaction mixture throughout to a continuous flow therethrough of steam in a fine state of subdivision in order to intermix thoroughly the steam with the reaction mixture thereby volatilizing and removing the furfural from the liquid in the dampened reaction mixture substantially as quickly as formed, said mass being maintained in a dampened condition.

8. The process of manufacturing furfural which comprises merely dampening a mass of roughage material with a quantity of liquid, mixing therewith a furfural forming catalyst and still maintaining the mass in dampened condition, and subjecting this reaction mixture to the action of heat, pressure and a continuous flow therethrough of steam in a fine state of subdivision in order to intermix thoroughly the steam with the reaction mixture thereby volatilizing and removing the furfural from the liquid in the dampened reaction mixture substantially as quickly as formed.

9. The process of manufacturing furfural which comprises admixing a mass of dampened roughage material with a non-volatile furfural forming catalyst, and subjecting this dampened roughage material throughout to a continuous flow therethrough of steam under pressure in a fine state of subdivision in order to intermix thoroughly the steam with the reaction mixture thereby volatilizing and removing the furfural from the liquid in the dampened reaction mixture substantially as quickly as formed, said mass being maintained in a dampened condition.

10. The process of manufacturing furfural which comprises admixing a mass of dampened roughage material with an acid furfural forming catalyst and still maintaining the mass in dampened condition, and subjecting this mixture to the conjoint action of heat, pressure and a continuous flow therethrough of a gas which is admitted in a fine state of subdivision in order to intermix thoroughly the gas with the reaction mixture thereby volatilizing and removing the furfural from the liquid in the dampened reaction mixture substantially as quickly as formed.

11. The process of manufacturing furfural which comprises admixing a mass of oat hulls with a quantity of an acid liquid sufficient only to dampen said mass, and subjecting this reaction mixture to the conjoint action of heat, pressure and a continuous flow therethrough of steam in a fine state of subdivision in order to intermix thoroughly the steam with the reaction mixture thereby volatilizing and removing the furfural from the liquid in the dampened mixture substantially as quickly as formed, while maintaining the mass in dampened condition.

12. The process of manufacturing furfural which comprises admixing a mass of oat hulls with a liquid comprising sulphuric acid in order merely to dampen said mass, and subjecting this dampened mass to the action of heat, pressure and a continuous flow therethrough of steam in a fine state of subdivision in order to impregnate thoroughly the reaction mixture while maintaining said mass of oat hulls in a dampened state and to remove the furfural therefrom substantially as quickly as formed.

13. The process of manufacturing furfural which comprises mixing a mass of roughage material with a quantity of liquid sufficient only to dampen the mass, subjecting this dampened roughage material to the action of heat and pressure while maintaining said mass in a dampened condition, and volatilizing the furfural and withdrawing it from the liquid in the dampened mass substantially as quickly as formed.

14. The process of manufacturing furfural which comprises mixing a dampened mass of oat hulls with a relatively small quantity of a dilute non-volatile acid, and subjecting this reaction mixture to the conjoint action of heat and pressure while maintaining it in a dampened state, and volatilizing the furfural and withdrawing it from the mass substantially as quickly as formed.

15. The process of manufacturing furfural which comprises dampening a mass of roughage material with a quantity of liquid, and subjecting this dampened roughage material to the action of heat and pressure, while maintaining said mass in a dampened condition, and continuously volatilizing and removing the furfural from the liquid in the dampened reaction mixture substantially as quickly as formed, said mass being maintained in dampened condition throughout the reaction period.

In witness whereof, we have hereunto subscribed our names.

CARL S. MINER.
HAROLD J. BROWNLEE.

CERTIFICATE OF CORRECTION.

Patent No. 1,735,084.　　　　　　　　　　Granted November 12, 1929, to

CARL S. MINER ET AL.

It is hereby certified that error appears in the above numbered patent requiring correction as follows: In the grant, title of invention should read "Process of Manufacturing Furfural" instead of "Processes of Manufacturing Furfural"; page 4, line 3, claim 10, for "and" read "while"; same page, line 23, claim 11, before the word "mixture" insert the word "reaction"; and that the said Letters Patent should be read with these corrections therein that the same may conform to the record of the case in the Patent Office.

Signed and sealed this 14th day of January, A. D. 1930.

(Seal)

M. J. Moore,
Acting Commissioner of Patents.